Figure 1:
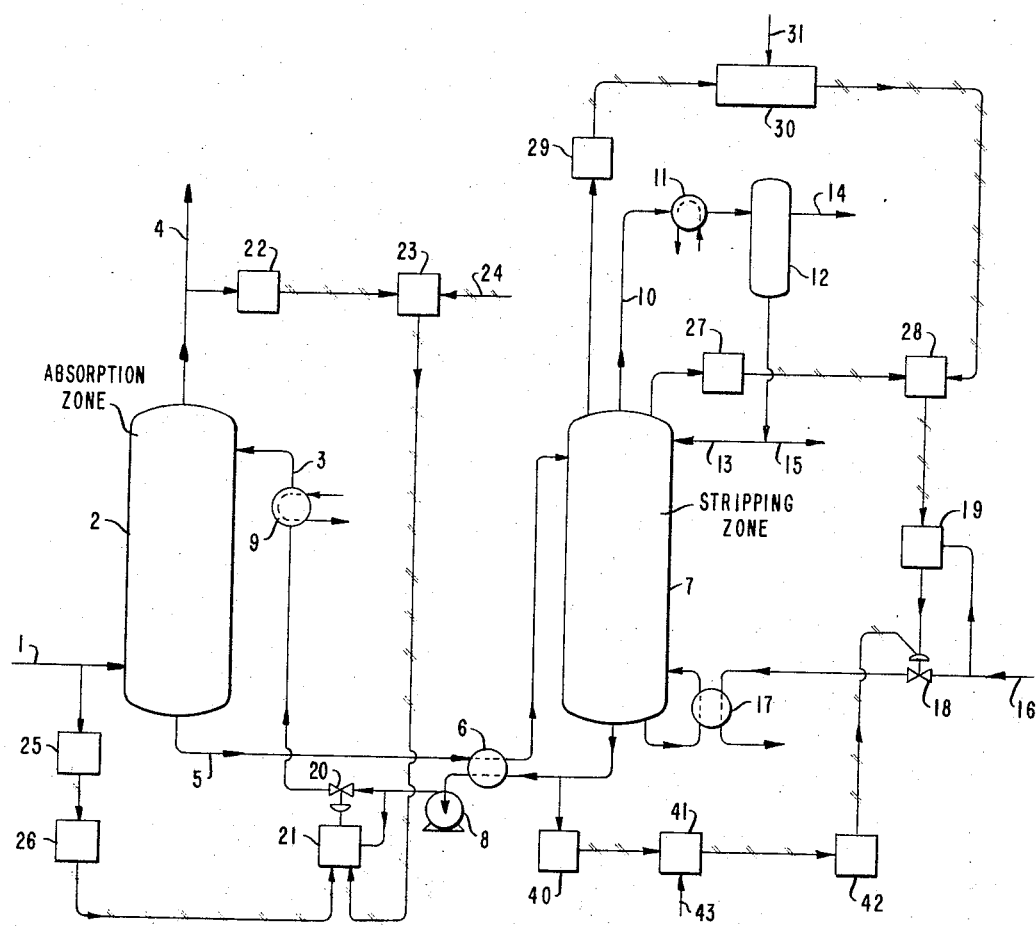

Aug. 29, 1967 A. P. BALLY ETAL 3,338,664
METHOD OF SEPARATING ACIDIC COMPONENTS FROM GASEOUS MIXTURES
Filed Dec. 20, 1962

INVENTORS:
ADRIANUS P. BALLY
ARIE G. VAN NES

BY: *Jack L. Foltz*

THEIR ATTORNEY

United States Patent Office 3,338,664
Patented Aug. 29, 1967

3,338,664
METHOD OF SEPARATING ACIDIC COMPONENTS FROM GASEOUS MIXTURES
Adrianus P. Bally and Arie G. van Nes, The Hague, Netherlands, assignors to Shell Oil Company, New York, N.Y., a corporation of Delaware
Filed Dec. 20, 1962, Ser. No. 246,241
Claims priority, application Netherlands, Dec. 27, 1961, 272,941
12 Claims. (Cl. 23—2)

The invention relates to a process for the separation of acidic gaseous components, especially hydrogen sulfide, carbon dioxide and if necessary carbon oxysulfide, from gases or liquids such as hydrogen, nitrogen, oxygen and light hydrocarbons, in general from gaseous or liquid mixtures which are not substantially soluble in water or aqueous liquids. This separation is effected by contacting the starting mixture with an aqueous solvent for the acidic gaseous components, such as an aqueous solution of potassium phosphate ($K_3PO_4$) or of an alkanol amine (monoethanol amine, diethanol amine, dipropanol amine and especially diisopropanol amine), or of sulfolane or of certain mixtures of the above such as sulfolane with an alkanol amine, the solvent removing the said acid components.

The solvent and starting mixture are preferably contacted countercurrently in the separation zone (extraction zone, absorption zone). As a rule the separation of the acid components need not be complete; generally a product has to be supplied, which meets a certain specification and therefore does not contain more acid components than corresponds with the limits mentioned in the said specification.

The purified product and the charged solvent are drawn from the separation zone. The charged solvent is regenerated by passing it to a stripping zone, in which it is at least substantially freed from the absorbed components by heating. The solvent thus regenerated is returned, at least substantially, to the separation zone, usually after being previously cooled to a suitable lower temperature by heat exchange and/or cooling.

Certain variations of the process described above are well-known and have been successfully used in practice for many years. Hitherto many of these variations have been carried out with the use of a relatively large, constant stream of solvent and a relatively large, constant supply of heat (steam) to the stripper, in order to ensure that under all circumstances (thus for example independently of the composition of the starting mixture to be treated) a product is supplied of which the residual content of acid components is invariably below the specification limits.

However, such a mode of operation is uneconomical, as much more steam is used for heating, and solvent for the separation, than is essential.

In accordance with the instant invention there is provided an economical method of carrying out the process described, so that it can be carried out continuously under optimum, or substantially optimum, conditions. The risk of corrosion is also reduced, since the stripper can be usually operated at lower temperatures. In the process according to the invention the (permissible) residual content of acid components in the purified product can be generally kept very low.

Now in accordance with the instant invention, the amount of solvent supplied to the separation zone is controlled on the basis of the residual content of acidic gaseous components (especially the $H_2S$ content) in the product already purified or in the lean recirculated solvent; and, if desired, on the basis of the quantity of acidic gaseous components in question (particularly the quantity of $H_2S$) added to the separation zone per unit of time, while the heat supplied to the bottom of the stripper is controlled on the basis of the temperature measured at the top part of the said stripper, in such a way that this temperature assumes, at least approximately, a prescribed value.

This prescribed value of the temperature is preferably set, and if necessary varied, according to the pressure in the stripper and the permissible content of acid components (especially the permissible $H_2S$ content) of the returned solvent; the latter content is directly related to the permissible residual content of these components in the purified product.

Figure 2:
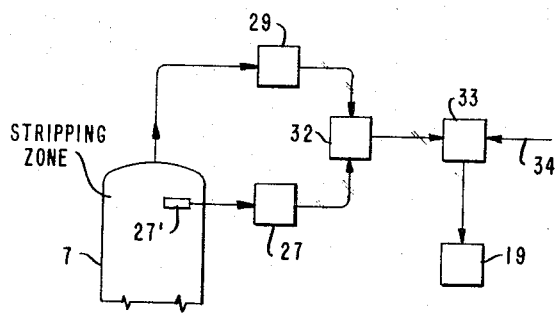

The invention will be further illustrated with reference to the drawing, in which FIGURE 1 is a diagram of an embodiment of the present process and FIGURE 2 shows a detail of the control system.

In the process shown in FIGURE 1 a gas mixture containing light hydrocarbons and hydrogen sulfide, and in which hydrogen, nitrogen and similar gases may also be present, is led through a line 1 to the bottom of an absorption zone 2 (an absorption column which may be provided with trays). To the top part of this zone, an aqueous solvent (in the present instance an aqueous solution of diisopropanol amine) is supplied through a line 3. The solvent is passed through the column countercurrently with the rising gases, as a consequence of which the hydrogen sulfide is at least substantially removed from the gas. The purified gas passes overhead through a line 4 and the charged solvent is removed at the bottom through a line 5. The charged solvent passes a heat exchanger 6 and is introduced at the top part of a stripping zone 7 (likewise a column which may be provided with trays). In the stripper the hydrogen sulfide is at least substantially separated from the solvent by heating. The stripped solvent leaves the stripper at the bottom and is returned to the absorption zone by means of a pump 8, through the line 3, via a cooler 9 after passing the above-mentioned heat exchanger 6.

Hydrogen sulfide, together with water vapor, leaves the stripper at the top part through a line 10. This mixture passes through a condenser 11 and a separator 12. The condensed water is separated in the separator and is completely or partly led through a line 13 to the top part of the stripping zone 7. The gas leaves the separator through a line 14; if desired, the condensed water, or a portion thereof, may be passed off through line 15, which measure may or may not be combined with supplying fresh water to the stripper 7. This water may be supplied, for example, by injecting condensed steam into the line 13.

Heat is supplied to the bottom part of the stripper 7 by reboiling; to this end steam is supplied through a line 16 to a reboiler 17.

The flow scheme described hitherto is well-known. In the known mode of operation a constant circulation of solvent is applied via the line 3, viz. an excessive circulation in order to insure that under all circumstances the hydrogen sulfide is removed to a sufficient extent from the gas to be purified. As a consequence of this mode of operation more hydrogen sulfide is usually separated from the gas than is strictly necessary, as the process is set to the most unfavorable conditions which could ever occur. Consequently, on the one hand there is a continuous relatively heavy loss of solvent, and on the other an excessive amount of steam is continuously consumed for the regeneration of the solvent. In fact, the quantity of steam supplied at 16 (or as the case may be the quantity of heat supplied or the quantity of condensate formed in 17 from the steam) is kept constant; this quantity is such that the solvent is always freed from the hydrogen sulfide to such an extent that it can work saisfactorily under the most unfavorable feed conditions, even when such unfavorable conditions do not occur; this means that the solvent is usually freed from hydrogen sulfide to a much larger extent than is necessary. In general, the steam consumption is therefore excessively high for two reasons, viz, excessive solvent circulation and excessive freeing from hydrogen sulfide.

The figure also shows the manner in which in the known embodiment the steam consumption can be kept constant by means of a control value 18 and a control and measuring device 19; the device 19 measures the quantity of steam passing through the line 16, observes deviations from the desired, preset amount of steam and accordingly controls the control valve 18. The same remarks apply when instead of the quantity of steam the quantity of condensate formed from this steam in the reboiler is kept constant. Instead of measuring the quantity of steam, the quantity of heat supplied to the reboiler may be measured; in this case a heat measuring device is used instead of a flowmeter. Heat-measuring can be conveniently used when heating is carried out by means of a non-condensing heating medium, for example hot oil.

In the known method the solvent circulation stream is kept constant in a similar manner. In this stream there is provided a control valve 20 which is operated by a measuring and control device 21. This device measures the flow rate and the valve is controlled in dependence thereon in such away as to keep the flow rate at a preset constant value.

The object of the invention is to carry out the process more economically by controlling the process in such a manner that the purified gas invariably just meets the specification covering the permissible residual content of acid components, viz. hydrogen sulfide.

If the quantity of hydrogen sulfide supplied per unit of time does not show excessively large variations, the method of control is as follows. The residual content of hydrogen sulfide in the purified gases is measured by means of a suitable conventional instrument 22 for the quantitative determination of hydrogen sulfide. This residual content should not exceed a certain value. Otherwise, the maximum permissible residual content of the purified gases may vary from case to case; in general, the permissible content depends upon the requirements made by the user.

The value measured by the instrument 22 is compared in a controller 23 with the value set on this controller at 24, the latter value conveniently being somewhat lower than the value corresponding to the said maximum permissible residual content. The signal of the controller 23 now is passed to the control device 21 and varies the set point of this device. The preset, constant (desired) value of the flow rate of the circulating solvent in the known embodiment is now varied via the measuring instrument 22 and the controller 23 in such a way that the residual content of hydrogen sulfide in the purified gases does not exceed the permissible maximum.

The control method operates in such a manner that the solvent circulation increases with increasing concentration of hydrogen sulfide in the purified gas and vice versa.

If considerable variations are to be expected in the quantity of hydrogen sulfide supplied with the feed per unit of time, the control method may be combined with a control technique based on the quantity of hydrogen sulfide present in the feed and supplied to the absorption zone per unit of time. This amount of hydrogen sulfide (i.e., the $H_2S$ content of the feed multiplied by the flow rate of the feed) is determined by an instrument 25; the value thus measured is passed to a control device 26, the signal of which also controls the set point of the control device 21.

The set point of the control device 21 may therefore be controlled either by the signal originating from 23 or by a suitable combination (for instance the sum) of the signals originating from 23 and 26.

The maximum permissible residual content of hydrogen sulfide in the purified gases also determines, at least substantially, the maximum residual content of hydrogen sulfide which may be allowed in the stripped solvent. In order to keep the steam consumption as low as possible, as already remarked, the removal of hydrogen sulfide should not exceed, at least not to a considerable extent, the removal corresponding to the said maximum permissible residual content in the purified solvent. Of course, the stripped solvent should not contain appreciably more than the maximum permissible residual content for a substantial period, as in this case the absorption in the column 2 does no longer take place in the proper manner.

Instead of keeping the steam consumption constant, as was formerly the case, this consumption is now controlled in such a way that the concentration of acid components, viz. hydrogen sulfide, of the stripped solvent just does not exceed the maximum permissible concentration, and is invariably kept very near to the latter concentration. According to one embodiment of the invention this control is accomplished on the basis of the temperature measured at the top part of the stripper, since surprisingly it has been found that this top temperature is a very sensitive indication of the hydrogen sulfide concentration in the stripped solvent.

In order to carry out the control method the top temperature is measured by an instrument 27. The value measured is passed to a controller 28 and there compared with the value set for the top temperature, viz the value of the top temperature at which the stripped solvent has the said maximum permissible residual concentration (or a somewhat lower concentration) of hydrogen sulfide. The signal of the controller 28 controls the set point of the control device 19 described above. In this way there is supplied precisely the minimum amount of steam which effects the desired degree of stripping of the solvent.

In this connection it should be noted that the value of the temperature set in the controller 28 should be changed if for any reason the degree of stripping in the column 7 has to be increased or reduced (a higher temperature being required for increased stripping).

Another embodiment for controlling steam consumption involves measuring directly the $H_2S$ content in the lean solvent by means of any conventional instrument, 40, capable of measuring quantitatively the $H_2S$ content and which is adapted for liquid and vapor samples. The value measured by the instrument 40 is compared in controller 41 with the value set on this controller at 43. The signal of the controller 41 is then passed to the control device 42 and varies the set point of this device. The preset, constant (desired) value of the flow rate of the steam introduced in the line 16 is then varied via the measuring instrument in such a way that the content of hydrogen sulfide in the stripped solvent being recycled to the absorption zone does not exceed the permissible maximum.

The relationship between the top temperature of the stripper and the hydrogen sulfide content of the stripped solvent is also found to be dependent on the pressure in the stripping column; this pressure need not always be constant and may depend on such factors as the quantity of hydrogen sulfide removed from the solvent and on disturbances caused by the installation in which the hydrogen sulfide produced is being worked up.

This dependence may be eliminated from the control process by keeping the pressure in the column constant. A control device for ensuring a constant pressure may be provided in the line 10 in a known manner.

However, it is to be preferred not to apply a constant pressure-control. If there is constant-pressure control the pressure in the stripper will almost continuously be higher than would be the case without this control and the temperature set on the controller 28 should be correspondingly higher; as a result the heating of the stripper column becomes less economical and there is a greater risk of corrosion caused by hydrogen sulfide.

In order to obviate this drawback, the pressure is measured by means of a pressure meter and the prescribed temperature, viz. the temperature set on the controller 28 varied according to the experimentally known relationship between this temperature and the pressure in the stripper for each desired degree of stripping of the solvent. The varying, prescribed temperature on the controller 28 may be adjusted by hand when pressure conditions in the stripper only change slowly. With more rapid variations, the value of the pressure measured by the pressure meter 29 may be passed as a signal to a device 30 to which device the desired degree of stripping (for example also in the form of a variable signal or by adjustment of a variable magnitude of this device) is additionally passed (at 30).

The said device supplies a signal with which the set point of the controller 28 (the prescribed value of the temperature) is adjusted.

FIGURE 2 shows a special embodiment of the above-mentioned control system in the case in which the pressure is not constant. The temperature measuring device 27 is equipped with a small vessel (probe) 27', which is situated inside the column 7 and follows the top temperature of this column. Inside the probe there is a material (partly liquid and partly vapor) having a vapor pressure curve which is equal, or nearly equal, to the vapor pressure curve of the mixture in the top part of the stripper, or which at least runs nearly parallel to the latter curve. In the present case this liquid may be, for example, water. The device 27 supplies a pressure which corresponds to the vapor pressure of the liquid in the probe 27' at the top temperature in the stripper. In a device 32 (for example a pneumatic relay circuit) this pressure is compared with the actual pressure prevailing in the column which is measured by means of 29. The device 32 supplies a controller 33 with a signal, the magnitude of which depends on the ratio of the two pressures just mentioned. In the controller 33 this signal is compared with the desired value of this ratio, which is supplied to or set at 32. The controller sends a signal to the control device 19 described above.

If the ratio of the two pressures corresponds to the value set on the controller 34, the set point of the control device 19 is unchanged. If, however, the pressure measured by 29 is higher than that corresponding to the said set ratio, then the setting point of 19 is shifted in such a way that a larger amount of steam is supplied; at a lower pressure the quantity of steam is reduced.

The said ratio value set at 34 may be varied; in this way it is possible to influence the desired degree of stripping of the solvent.

When applying the control system shown in FIGURE 2 in the process shown schematically in FIGURE 1, the devices 30 and 28 are replaced by the devices 32 and 33, and use is also made of a special method of measuring the temperature (27, 27').

For the sake of simplicity, in the above description only hydrogen sulfide was mentioned; if other acid components, for example carbon dioxide, or a combination of acid components, for instance hydrogen sulfide and carbon dioxide, have to be removed, the above applies in the same way as far as the separation, stripping, measuring and control of such other components or such combinations of components is concerned.

The drawing given is only one of the several possible embodiments which may differ in detail. The control 20, for example, need not be effected by means of a valve but may also be effected in another manner, for instance by controlling the pumping rate of the pump 8. Instead of a control system involving a control valve in a line, a control system with a by-pass line may be used. Heating does not necessarily have to be effected by means of steam, but may be carried out, for example, with hot oil. It is not necessary to recirculate all solvent from the stripper 7, but a relatively small solvent stream may be drawn off and replaced by fresh solvent. If desired, absorption in the column 2 may be in the form of rectifying absorption.

The separation zone may consist of more than one column, in which columns different starting mixtures may be treated, if desired, the various solvent streams being stripped in a single stripper. The stripping zone also may consist of a number of stripping columns.

We claim as our invention:

1. In a process for the separation of acidic gaseous components from a gaseous mixture comprising contacting said mixture with an aqueous solvent capable of substantially absorbing said acidic components in a separation zone, withdrawing the purified product and the charged solvent from said zone, stripping the absorbed components at least substantially free from the charged solvent in a stripping zone, and returning the stripped solvent to the separation zone, the improvement which comprises minimizing solvent flow and heat requirements by: (1) monitoring the residual content of acidic gaseous components of the purified product; (2) transmitting the measurement obtained from said monitoring of (1) for correlation with a specified preset value representing the permissible maximum content of the acidic components in the purified product; (3) varying the amount of solvent introduced into the separation zone per unit of time in direct response to the differential obtained in (2); (4) monitoring the temperature at the top of said stripping zone; (5) transmitting the measurement obtained from said monitoring of (4) for correlation with a specified value representing the temperature at which said acidic gaseous components are present in the stripped solvent in the substantially constant maximum permissible content; and (6) varying the amount of heat supplied to the stripping zone in response to the differential obtained in (5).

2. The process of claim 1 wherein the acidic gaseous components are selected from the group consisting of hydrogen sulfide, carbon dioxide, carbon oxysulfide, and mixtures thereof.

3. The process of claim 1 wherein the principal acidic gaseous component is hydrogen sulfide.

4. The process of claim 1 wherein the solvent is selected from the group consisting of an aqueous solution of $K_3PO_4$, aqueous monoethanolamine, aqueous diethanolamine, aqueous propanolamine, aqueous isopropanolamine, aqueous sulfolane and mixtures thereof.

5. The process of claim 1 wherein the solvent is aqueous diisopropanolamine.

6. The process of claim 1 wherein the solvent is an aqueous mixture of diisopropanolamine and sulfolane.

7. The process of claim 1 wherein the temperature monitoring of (4) is obtained by inserting a probe at the top of the stripping zone containing a material having a vapor pressure curve substantially equal to that of the mixture, the stripping zone pressure is compared with the vapor pressure of the liquid in the probe, the differential is correlated with a desired ratio of pressure value, and varying the amount of heat supplied to the stripping zone is varied in response to the differential obtained between the measured ratio of pressures and specified desired ratio.

8. The process of claim 7 wherein the material contained in the probe is water.

9. The process of claim 1 wherein the specified value of temperature of (5) is controlled by monitoring the pressure, correlating the monitored value with that value permissible for the degree of stripping desired, and adjusting the temperature value in response thereto.

10. The process of claim 1 wherein the specified value of temperature of (5) is controlled by monitoring the pressure and correlating the monitored value with that value required for the permissible residual content of acidic gaseous components of the purified product.

11. In a process for the separation of acidic gaseous components from a gaseous mixture comprising contacting said mixture with an aqueous solvent capable of substantially absorbing said acidic components in a separation zone, withdrawing the purified product and the charged solvent from said zone, stripping the absorbed components at least substantially free from the charged solvent in a stripping zone, and returning the stripped solvent to the separation zone, the improvement which comprises minimizing solvent flow and heat requirements by: (1) monitoring the amount of acidic gaseous component supplied to the separation zone in said gaseous mixture; (2) correlating the measurement obtained from (1) with a specified preset value representing the permissible maximum content of the acidic components in the purified product; (3) controlling the amount of solvent introduced into the separation zone in response to the differential obtained in (2); (4) monitoring the temperature at the top of said stripping zone; (5) transmitting the measurement obtained from said monitoring of (4) for correlation with a specified value representing the temperature at which said acidic gaseous components are present in the stripped solvent in the substantially constant maximum permissible content; and (6) varying the amount of heat supplied to the stripping zone in response to the differential obtained in (5).

12. In a process for the separation of acidic gaseous components from a gaseous mixture comprising contacting said mixture with an aqueous solvent capable of substantially absorbing said acidic components in a separation zone, withdrawing the purified product and the charged solvent from said zone, stripping the absorbed components at least substantially free from the charged solvent in a stripping zone, and returning the stripped solvent to the separation zone, the improvement which comprises minimizing solvent flow and heat requirements by (1) monitoring the residual content of acidic gaseous components of the purified product; (2) transmitting the measurement obtained from said monitoring of (1) for correlation with a specified preset value representing the permissible maximum content of the acidic components in the purified product; (3) varying the amount of solvent introduced into the separation zone per unit of time in direct response to the differential obtained in (2); (4) monitoring the content of acidic gaseous components present in the stripped solvent returned to the separation zone; (5) transmitting the measurement obtained from (4) for correlation with a specified value representing the substantially constant maximum permissible content of acidic component in returned solvent suitable to produce a purified product of the permissible maximum content of acidic gaseous components; and (6) varying the amount of heat supplied to the stripping zone in response to the differential obtained in (5).

References Cited

UNITED STATES PATENTS

| | | | |
|---|---|---|---|
| 2,799,851 | 7/1957 | Moore | 23—2 X |
| 2,984,988 | 5/1961 | Berger et al. | 23—232 X |
| 3,098,705 | 7/1963 | Bally | 23—3 |
| 3,161,461 | 12/1964 | Deal et al. | 23—3 |

OSCAR R. VERTIZ, *Primary Examiner.*

EARL C. THOMAS, *Examiner.*